SHIFT REGISTER WITH VARIABLE TRANSFER RATE

Filed Nov. 1, 1968 2 Sheets-Sheet 1

TO FIG. 1b

INVENTOR
WILLIAM P. ROGERS
BY Theodore Jay Jr.
ATTORNEY

July 21, 1970 W. P. ROGERS 3,521,245

SHIFT REGISTER WITH VARIABLE TRANSFER RATE

Filed Nov. 1, 1968 2 Sheets-Sheet 2

INVENTOR
WILLIAM P ROGERS
BY Theodore Jay
ATTORNEY

United States Patent Office 3,521,245
Patented July 21, 1970

3,521,245
SHIFT REGISTER WITH VARIABLE TRANSFER RATE

William Paul Rogers, Collingswood, N.J., assignor to Ultronic Systems Corporation, a corporation of Delaware Filed Nov. 1, 1968, Ser. No. 772,480
Int. Cl. G11c *19/00*
U.S. Cl. 340—173 6 Claims

ABSTRACT OF THE DISCLOSURE

An information storage device having a plurality of individual storage stages or registers connected in cascade. Information in the form of digital electrical signals supplied to the input of the device and is successively shifted, under the control of clock pulses and with the use of control circuitry, through each of the stages to the output of the device. The rates at which information is supplied to and transferred from the device are variable. The device, in accommodating itself to these variable rates, exhibits a variable rate of internal transfer of information from its input to its output. To this end, information is transferred between any two adjacent stages only when the first of these two stages contains stored information and a selected one of the stages (such as the next stage) following the second of these two stages is empty.

BACKGROUND OF THE INVENTION

Various systems used in the securities and exchanges markets are adapted to receive transaction information from ticker lines in the form of electrical equivalents of alpha-numeric characters and to display these characters in the form of a moving display. The information on the ticker input lines characteristically exhibit sudden starts and stops. Viewers of the moving display find such starts an stops to be uncomfortable to the eye. As a result, moving displays are designed in such manner that the display of information accelerates or decelerates linearly on the display as the information on the ticker lines starts and stops.

My device can be interposed between the ticker lines and the display to provide temporary storage of information received on the ticker lines and not yet displayed and thus enable the display to function as described.

SUMMARY OF THE INVENTION

In accordance with the principles of my invention, my device responds to periodically spaced clock pulses supplied thereto. The device is provided with a plurality of storage stages which are connected in cascade. The first stage is designated as the input of the device and the last stage is designated as the device output.

My device utilizes a plurality of data-available flip-flops. Each data flip-flop is coupled to a corresponding one of the storage stages and characterized by first and second mutually exclusive electric states. Each data flip-flop is in its first state when its corresponding stage has information stored therein, and is in the second state when this stage is empty.

My device further utilizes a plurality of load flip-flops. Each load flip-flop is associated with a corresponding stage for controlling the shifting of new information into the corresponding stage. Each load flip-flop is also characterized by first and second mutually exclusive electric states. Each load flip-flop is in its first state when shifting of information into its corresponding stage is permitted and is in its second state when such shifting is blocked or prevented.

First means coupled to all of said stages and responsive to the clock pulses initiates the shift of information into any selected stage upon receipt of each clock pulse, providing that the load flip-flop associated with this selected stage is in its first state. If this load flip-flop is in its second stage, the shift cannot take place.

Second means coupled to both sets of flip-flops and responsive to the clock pulses places any load flip-flop into its first state upon receipt of each clock pulse whereby shifting can occur upon receipt of the next clock pulse when and only when (a) the stage immediately preceding the stage corresponding to this load flip-flop has information stored therein, and (b) a selected one of the stages following the corresponding stage is empty.

Information stored in the last stage or output of my device is released, as for example, to a display, when a suitable control signal is supplied to this stage. The clock rate is typically N times the control signal rate where N is an integer equal to the total number of stages in my device. Information supplied to the first stage or input at a variable rate, as for example, from ticker lines. When the stages are all empty, all incoming information is available at the clock rate for successive shifting through each stage under the control of successive clock pulses to the output stage. When the stages are partially or completely full, the incoming information is available at the output stage only at the rate at which successive control signals are supplied thereto to the output stage.

The net result is that my device accepts characters at its input and presents characters at its output in the same order as received but the time interval required for the internal transfer of these characters between input and output is varied in accordance with the requirements of the system in which my device is used.

DETAILED DESCRIPTION OF PREFERRED EMBODIMENTS

Figure 1A:
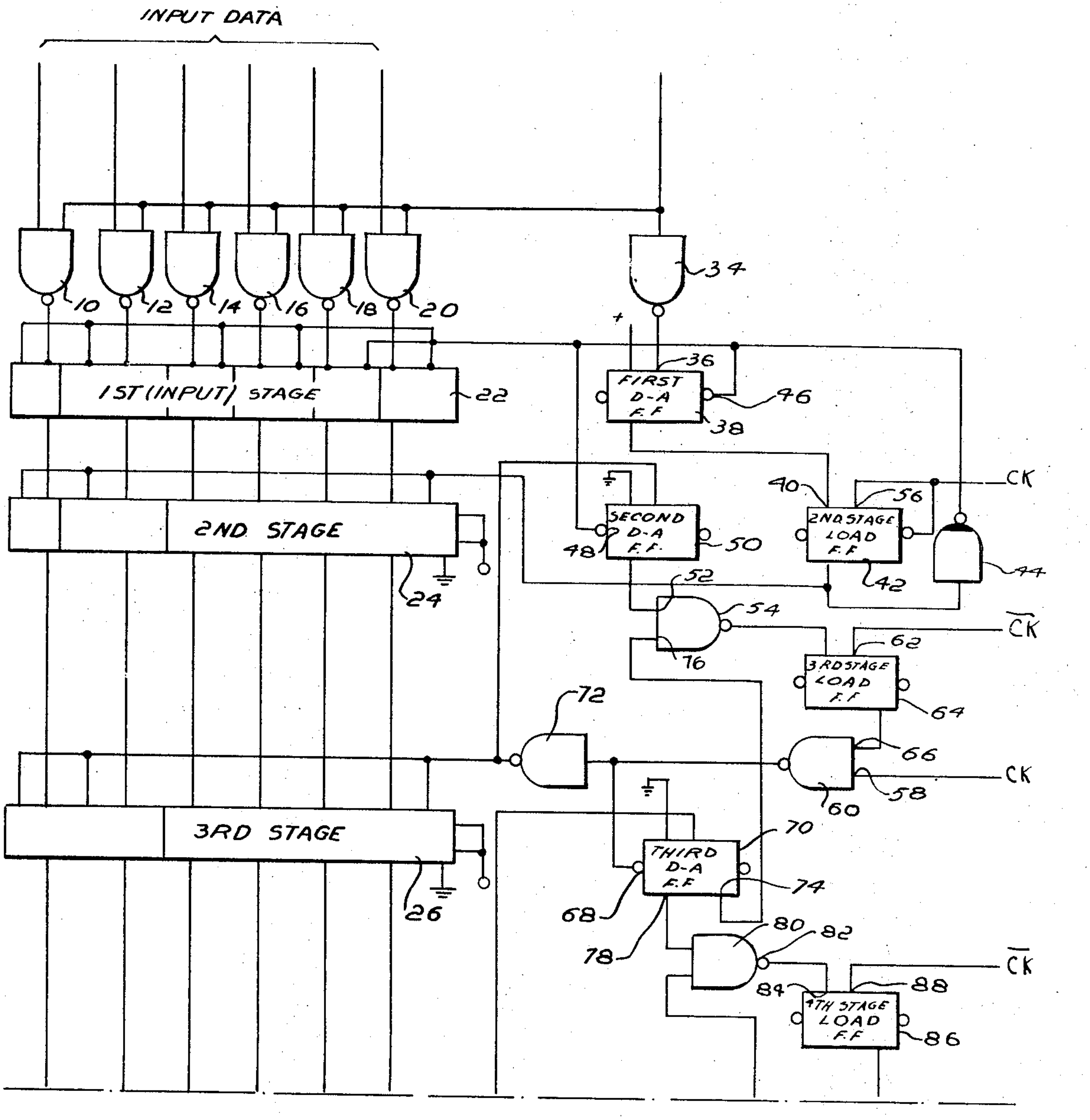
FIG. 1*a* is a block diagram of a portion of my invention.
Figure 1B:
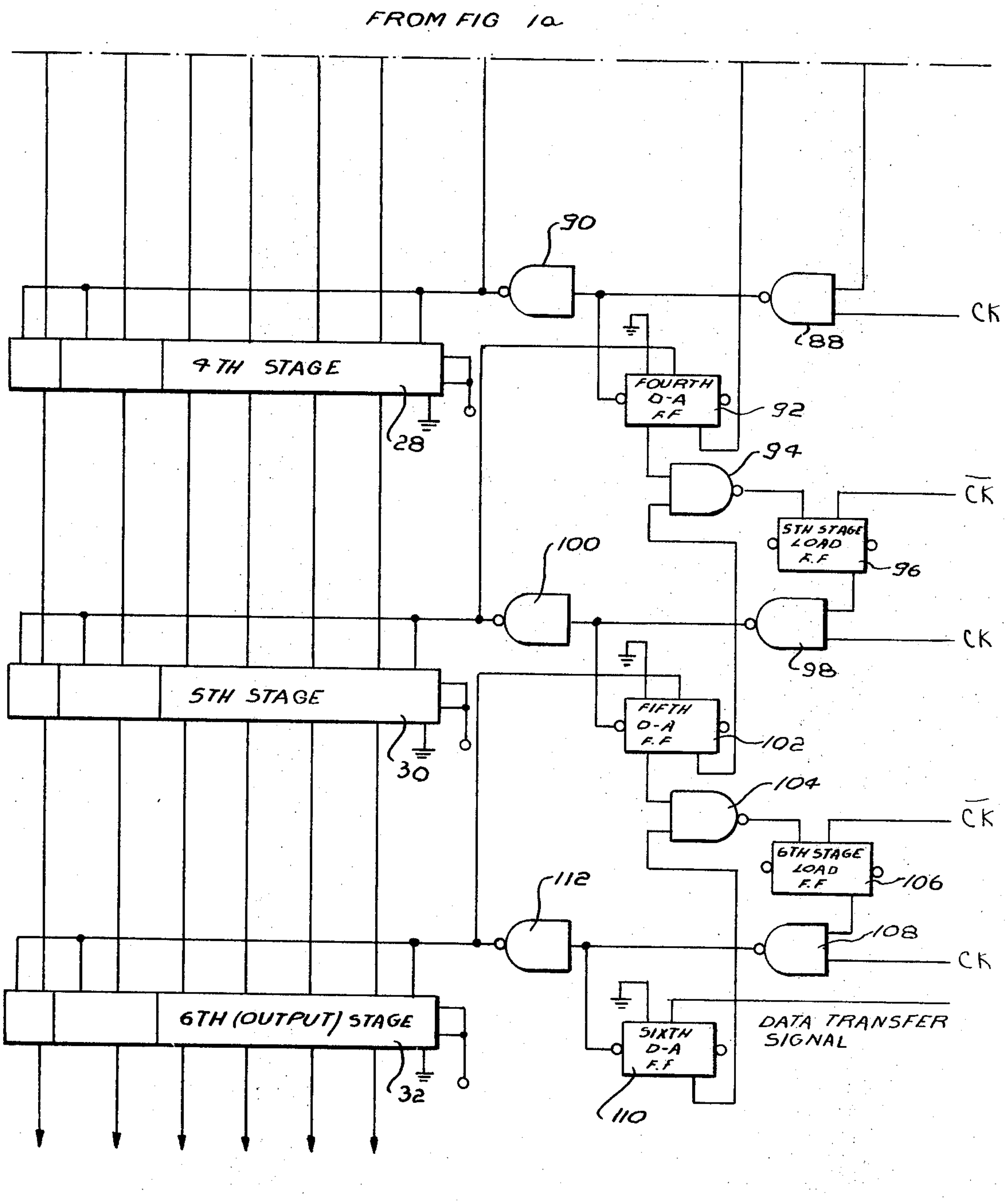
FIG. 1*b* is a block diagram of the remaining portion of my invention.

Referring now to FIGS. 1*a* and 1*b*, information in bit-parallel character-series form is supplied to input gates 10, 12, 14, 16, 18 and 20. The outputs of these gates are connected to appropriate inputs of a six bit register 22 which serves as a first or input stage. Five such additional registers identified at 24, 26, 28, 30 and 32 respectively, thus respectively representing second, third, fourth, fifth and sixth stages, are connected in cascade. The sixth stage 32, serves as an output stage.

An input data available signal is supplied to the input of inverter 34. The output of inverter 34 is connected to the input 36 of a first data-available flip-flop 38. The output of flip-flop 38 is connected to input 40 of a second stage load flip-flop 42. The output of flip-flop 42 is connected through inverter 44 to another input 46 of flip-flop 38. The output of inverter 44 is connected to stage 22 (to supply a "clear" signal thereto) and to input 48 of a second data-available flip-flop 50. The output of flip-flop 50 is supplied as a first input 52 of gate 54. The output of flip-flop 42 is also connected directly to stage 24 (to control shifting thereto). Clock pulses are supplied to input 56 of flip-flop 42 as well as to an input 58 of gate 60.

Inverted clock pulses are supplied to input 62 of a third stage load flip-flop 64. The output of flip-flop 64 is connected to input 66 of gate 60. The output of gate 60 is connected to input 68 of the third data available flip-flop 70 as well as being connected through inverter 72 as a first signal to stage 26.

One output 74 of flip-flop 70 is connected as a second input 76 of gate 54. A second input 78 of flip-flop 74 is connected to input 80 of gate 82. The output of gate 82 is connected to input 84 of the fourth stage load flip-flop 86. Inverted clock pulses are supplied to another input 88 of flip-flop 86. The output of flip-flop 86 is connected as an input to gate 88. Clock pulses are supplied as a second input to gate 88. The output of gate 88 is connected through inverter 90 as a shift control to stage 28.

The output of gate 88 is also connected as an input to a fourth data-available flip-flop 92. One output of flip-flop 92 is connected as a second input to gate 82. Another output of flip-flop 92 is connected as an input to gate 94. The output of gate 94 is connected as an input to the fifth stage load flip-flop 96. Inverted clock pulses are supplied as another input to flip-flop 96. The output of flip-flop 96 is connected at one input to gate 98 with clock pulses being supplied as a second input thereto.

The output of gate 98 is connected through inverter 100 to stage 30 and is also connected directly as an input to the sixth data available flip-flop 102. One output of flip-flop 102 is connected as another input to gate 94. The other output of flip-flop 102 is connected as an output to gate 104. The output of gate 104 is connected as an input to the sixth stage load flip-flop 106 which also receives inverted clock pulses as a second input. The output of flip-flop 106 is connected to the input of gate 108 while clock pulses are supplied to another input thereof. The output of gate 108 is connected directly as an input to the sixth data available flip-flop 110 and is also connected through inverter 112 as a first control to stage 32. The output of flip-flop 110 is connected to an input of gate 104. Data transfer signals are supplied to a second input of flip-flop 110.

The clock pulses are generated at a recurrence frequency which is N times as large as the fastest rate at which data can be read out of stage 32, where N is an integer equal to the total number of stages (in this example N is six). The rate at which data can be read out of stage 32 is determined by the recurrence frequency of the data transfer signals.

Each data-available flip-flop has two electric states. One state, represented by a binary one, indicates that information is stored in the corresponding stage. The second state, represented by a binary zero, indicates that the corresponding stage is empty. Note that flip-flops 38, 50, 74, 92, 102 and 110 respectively represent stages 22, 24, 26, 28, 30 and 32.

Each load flip-flop is associated with a corresponding stage other than the first stage. Thus load flip-flops 42, 58, 86, 96 and 106 are associated with stages 24, 26, 28, 30 and 32 respectively. The purpose of each load flip-flop is to control the shifting of new information into the stage with which it is associated. Each load flip-flop has two electric states. In the first state, represented by a binary one, shifting can take place under the control of the clock pulses. In the second state, represented by a binary zero, no shift can take place.

Any selected load flip-fiop can be place into its first state, and thus indicate a binary one, when and only when two conditions are satisfied simultaneously. The first condition is that the stage immediately preceding the stage associated with the particular flip-flop must have data stored therein. The second condition is that a selected stage following the stage corresponding to the selected load flip-flop is empty. (In this example, the selected stage is adjacent the corresponding stage.) If these conditions are satisfied, upon the arrival of either a clock pulse or its inverse, the data will be shifted from the preceding into the corresponding stage. The system is so arranged that shifting of new information into any stage other than the first stage automatically erases any information previously stored therein. The data, if any, in the first input stage can only be erased when a clear pulse is supplied thereto from the output of inverter 44.

The system then works as follows. Initially all stages are empty. Input data in the form of bit-parallel character-series form appears at the inputs of gates 10, 12, 14, 16, 18 and 20. When an input data available signal is supplied both to the input of inverter 34 and to the inputs of all these gates, the character in bit form is stored in stage 22. At the same time, the data available signal passing through inverter 34 places the first data available flip-flop 38 into its first state, whereby a binary one appears at its output, indicating that information has been stored in stage 22. At this point, stages 24, 26, 28, 30 and 32 are all empty. Upon the arrival of a clock pulse at load flip-flop 42, flip-flop 42 produces a binary one, which is supplied as a shift signal to stage 24 whereby the information in stage 22 is transferred to stage 24; at the same time the signal from this flip-flop through inverter 44 resets flip-flop 38 to a binary zero and clears stage 22 to receive an additional character if and when available as flip-flop 38 is reset.

Thereafter, at each successive clock pulse or its inverse (the timing of each pulse and its inverse is such that they are 180° out of phase with each other) the information so stored is shifted from stage to stage until it arrives at the output stage. The information in the output stage must remain there until the arrival of a data transfer signal (which will initiate transfer and at the same time enables the stage to be available to receive new information from the preceding stage). Since the clock pulses have a much higher recurrence frequency than the data transfer signals, it is necessary to prevent additional data from being shifted into the output stage when clock pulses are supplied in the interval between successive data transfer signal.

This action is accomplished automatically since the data available flip-flop associated with the output stage contains a binary one; as a result the corresponding load flip-flop contains a binary zero, and no shift can occur.

However, preceding stages can continue shifting operations until all stages contain information stored therein. The number of stages and the recurrence frequencies of the pulses are so chosen with respect to the maximum rate of arrival of information at the input stage and the minimum rate of transfer of information from the output stage, that my device always has sufficient capacity to function without jamming.

In the embodiment, described above, there is no load flip-flop associated with the first storage stage, but each additional stage has a separate load flip-flop associated therewith. It will be obvious to those skilled in the art that an additional load flip-flop can be added for use with the first stage.

While I have described my invention with particular reference to the drawings, my protection is to be limited only by the terms of the claims which follow.

What is claimed is:

1. An information storage device responsive to periodically spaced clock pulses and comprising:

a plurality of storage stages connected in cascade with the first stage being designated as the input stage and the last stage designated as the output stage;

a plurality of data-available flip-flops, each data flip-flop having first and second electric states and being coupled to a corresponding stage, each data flip-flop being in the first state when its stage has information stored therein and being in the second state when its stage is empty;

a plurality of load flip-flops, each load flip-flop being associated with a corresponding stage for controlling the shifting of new information into the said corresponding stage, each load flip-flop having first and second electric states, each load flip-flop being in said first state when shifting into its corresponding stage is permitted and being in said second state when shifting is blocked;

first means responsive to said clock pulses and coupled to said stages to initiate the shift of information into any stage upon receipt of each clock pulse providing that the load flip-flop associated with said any stage is in its first state, said shift being inhibited when said associated load flip-flop is in its second state; and second means responsive to said clock pulses and coupled to said load and data flip-flops to place any load flip-flop into its first state upon receipt of each clock pulse only when (a) the stage immediately preceding the stage corresponding to said any load flip-flop has information stored therein, and (b) a selected one of the stages following said corresponding stage is empty.

2. A device as set forth in claim 1 wherein each load flip-flop is associated with a corresponding stage other than said input stage.

3. A device as set forth in claim 1 wherein insertion of information into any stage erases any information previously stored therein.

4. A device as set forth in claim 1 further including third means coupled to said output stage and responsive to control signals, said third means releasing to a utilization circuit the information in said output stage upon receipt of each control signal.

5. A device as set forth in claim 3 wherein the minimum time interval between adjacent control signals is at least N times as large as the interval between adjacent clock pulses where N is an integer equal to the number of storage stages in said device.

6. A device as set forth in claim 4 wherein the selected one of the stages following the corresponding stage is adjacent the corresponding stage.

References Cited

UNITED STATES PATENTS

| | | | |
|---|---|---|---|
| 2,985,835 | 5/1961 | Stuart | 340—173 X |
| 3,117,307 | 1/1964 | Davie | 340—173 |
| 3,126,524 | 3/1964 | Blocher | 340—173 |

TERRELL W. FEARS, Primary Examiner

U.S. Cl. X.R.

307—221